(12) United States Patent
Ho et al.

(10) Patent No.: US 12,141,663 B2
(45) Date of Patent: Nov. 12, 2024

(54) DOUBLE-BARRELED QUESTION PREDICTOR AND CORRECTION

(71) Applicant: SURVEYMONKEY INC., San Mateo, CA (US)

(72) Inventors: King Chung Ho, Foster City, CA (US); Fernando Espino Casas, San Mateo, CA (US); Chun Wang, Gatineau (CA); Melanie Lei, San Mateo, CA (US)

(73) Assignee: SurveyMonkey Inc., San Mateo, CA (US)

( * ) Notice: Subject to any disclaimer, the term of this patent is extended or adjusted under 35 U.S.C. 154(b) by 788 days.

(21) Appl. No.: 16/910,404

(22) Filed: Jun. 24, 2020

(65) Prior Publication Data

US 2021/0406758 A1 Dec. 30, 2021

(51) Int. Cl.
*G06Q 30/02* (2023.01)
*G06F 17/16* (2006.01)
*G06N 20/00* (2019.01)

(52) U.S. Cl.
CPC ............ *G06N 20/00* (2019.01); *G06F 17/16* (2013.01)

(58) Field of Classification Search
None
See application file for complete search history.

(56) References Cited

U.S. PATENT DOCUMENTS

| | | | | |
|---|---|---|---|---|
| 11,120,364 B1* | 9/2021 | Gokalp | ............ | G06N 20/00 |
| 2005/0286772 A1* | 12/2005 | Albertelli | ............ | G06F 18/254 |
| | | | | 382/224 |
| 2008/0194946 A1* | 8/2008 | Summers | ............ | A61B 5/4255 |
| | | | | 600/425 |
| 2011/0137841 A1* | 6/2011 | Yuta | ............ | G16B 40/20 |
| | | | | 706/20 |
| 2016/0140210 A1* | 5/2016 | Pendyala | ............ | G06F 40/205 |
| | | | | 707/737 |
| 2018/0240031 A1* | 8/2018 | Huszar | ............ | G06N 3/045 |
| 2019/0260694 A1* | 8/2019 | Londhe | ............ | H04L 51/216 |
| 2020/0184016 A1* | 6/2020 | Roller | ............ | G06N 3/08 |
| 2020/0202171 A1* | 6/2020 | Hughes | ............ | G06F 18/2113 |
| 2020/0218939 A1* | 7/2020 | Mansour | ............ | G06N 20/00 |

(Continued)

FOREIGN PATENT DOCUMENTS

CN 201911166691 * 11/2019 ............ G06F 16/35

OTHER PUBLICATIONS

Double Barreled Questions: An Analysis of the Similarity of Elements and Effects on Measurement Quality, Natalja Menold, Journal of Official Statistics, vol. 36, No. 4, 2020, pp. 855-886.*

(Continued)

*Primary Examiner* — David J Stoltenberg
(74) *Attorney, Agent, or Firm* — Miller Nash LLP

(57) ABSTRACT

A computer-implemented method includes gathering data samples into a data set, correcting for imbalance in the data set to produce a corrected data set by applying active learning to the data set to increase a number of double barreled question data samples occurring in the data set, selecting an optimal machine learning model for the corrected data set, training the optimal machine learning model using the corrected data set, operating the optimal machine learning model on new data to produce a prediction result, and generating a visual representation of at least one prediction results.

16 Claims, 11 Drawing Sheets

(56) References Cited

U.S. PATENT DOCUMENTS

| | | | |
|---|---|---|---|
| 2020/0250527 A1* | 8/2020 | Zhao | G06N 3/047 |
| 2021/0174023 A1* | 6/2021 | Gao | G06F 16/3329 |
| 2021/0174161 A1* | 6/2021 | Perez | G06N 3/004 |
| 2021/0240776 A1* | 8/2021 | Jawagal | G06N 3/049 |
| 2021/0374168 A1* | 12/2021 | Srinivasan | G06V 10/82 |
| 2022/0051586 A1* | 2/2022 | Stankevich | A61B 5/7267 |

OTHER PUBLICATIONS

Committee based sample selection for probabilistic classifiers; Argamon-Engelson et al., Journal of Artificial Intelligence Research 11 (1999) 335-360.*

Committee-Based Sampling for Training Probabilistic Classifiers; Dagan et al. Journal of Artificial Intelligence Research, vol. 11, pp. 335-360, 1999.*

L-Shapley and C-Shapley: Efficient Model Interpretation for Structured Data, Chen et al., arXiv:1808.02610v1 [cs.LG] Aug. 8, 2018.*

Structural query-by-committee, Dasgupta et al., arXiv:1803.06586v1 [cs.LG] Mar. 17, 2018.*

Chakraborty et al. Superensemble Classifier for Improving Predictions in Imbalanced Datasets arXiv:1810.11317v1 [cs.LG] Oct. 25, 2018.*

* cited by examiner

DOUBLE-BARRELED QUESTION PREDICTOR AND CORRECTION

FIELD

This disclosure relates online survey generation, more particularly to using machine learning to predict double-barrel questions to allow for their correction.

BACKGROUND

A double-barreled question (DBQ) touches upon more than one subject of interest in the question, yet allows only one answer. For example, a DBQ may ask, "Do you agree with the following statement: Tom is nice, friendly and professional?" with the possible answer options of "agree" or "disagree." This DBQ can mislead survey takers because the multiple parts of the question prevent the clear identification of the part of the question to which the answer applies. If the survey taker answers "agree," one does not know if the survey taker agrees to the entire statement that Tom is nice, friendly and professional, or only with one or more parts of the statement, that Tom is one or two of those answers. This affects the resulting data for the survey as now the answers to at least one of the questions has accuracy issues. Correcting the DBQ to a neutral question uncovers a person's unbiased opinion towards a subject, an important factor in survey creation and answer tracking.

DBQs make up one of the leading causes of response bias, but limited work exists in the methodology to classify DBQs. Most work only suggests that the existence of a grammatical conjunction, such as "AND." However, this simple and straightforward approach has inherent errors because properly constructed questions may have conjunctions. This may result in the survey system flagging the question incorrectly as a DBQ.

BRIEF DESCRIPTION OF THE DRAWINGS

FIG. 2 shows a user interface of an on-line survey system.

FIG. 3 shows a flowchart of a method to correct for imbalance in training data sets.

FIG. 11 shows a user interface with a prediction result.

DETAILED DESCRIPTION

Figure 1:
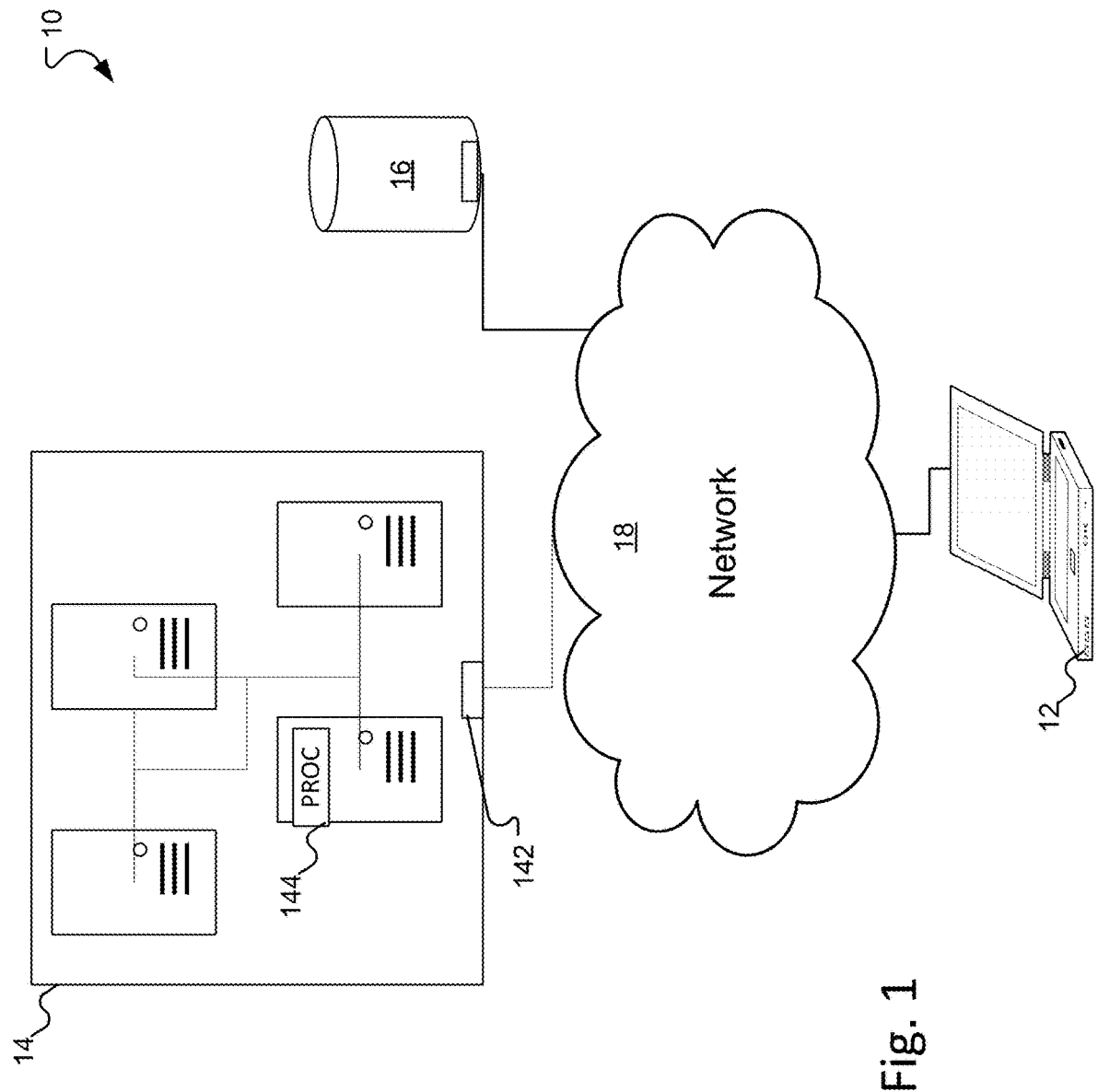
FIG. 1 shows an online survey system incorporating machine learning for survey creation.

The embodiments here involve a novel machine learning framework to accurately classify and interpret survey double-barreled questions (DBQs), common survey research errors that can cause response bias. The embodiments employ a machine learning framework implemented in an on-line survey platform.

The below discussion uses several terms that have particular meanings. As used here, the term "data sample" means a question and answer pair, which may be referred to as an input pair or a text pair. The term "data set" refers to a collection of data samples, which may be used in training and operation of a machine learning system.

The term "machine learning" as used here refers to computing systems that execute software code that provides the computing system the ability to automatically learn and improve its own operation without receiving explicit programming to do so. Machine learning includes supervised machine learning, unsupervised machine learning, and artificial intelligence systems, including neural networks. Machine learning typically uses models based upon data inputs to generate results relevant to the data.

The term "machine learning model" typically consists of a representation, possibly based upon statistics, of a real-world process. The code executed by the computing system finds patterns in training data resulting in input parameters that correspond to an output target. The resulting model can then process additional data to make predictions. The system may involve supervised learning, in which the data set contains both the inputs and the desired outputs. The model learns a function that allows it correctly to determine outputs for inputs that were not part of the training data. The system may also involve unsupervised learning, in which the model takes a set of data that only has inputs and identifies patterns in the data that allow it to provide outputs based upon the matching or unmatching to the patterns in each new piece of data. The approaches and the discussion below may focus on supervised learning, but the system may also apply to unsupervised learning.

The term "computing system" means any device or set of devices that have at least one processing element, at least one memory to store code for execution by the processing element and data, and at least one user interface to allow a user to interact with the computing system. The computing system may also include network interfaces that allow the computing system to connect to one or more networks. The computing system may exist as a single device in a single housing, may include several devices that operate in a distributed manner, and may include devices configured as user devices, such as personal computers, laptops, tablets, smartphones, etc., and device configured as servers, data repository, routers, access points, etc. The discussion below may define further terms as needed.

The term "processing element" means any device or portion of a device that operates on data to produce a result. For example, the processor may comprise a general-purpose processor, a central processing unit, a node on part of an artificial neural network, such as a convolutional neural network, deep neural network or other deep learning processing entity. The machine learning mentioned above may involve a network of simple processing elements. The processor referred to here as being part of the instrument may be one of those elements, or may interact with one or more of these elements.

The computing system 14 may include one or more processors 144 that may be configured to communicate with the network interface 142 may provide an interface to other device systems and networks. The network interface 142 may serve as an interface for receiving data from and transmitting data to other systems from the computing system 14. The network interface 142 may include a wireless interface that allows the system 14 to communicate across wireless networks through a wireless access point, and may also include a cellular connection to allow the device to communicate through a cellular network. The network interface will allow the computing system 14 to communicate with one or more client devices such as 12 and system data storage 16.

The device data store/memory 16 may include one or more separate memory devices. It may provide a computer-readable storage medium for storing the basic programming and data constructs that may provide the functionality of at least one embodiment of the disclosure here. The data store 16 may store the applications, which include programs, code modules, and instructions, that, when executed by one or more processors, may provide the functionality of one or more embodiments of the present disclosure. The data store 16 may comprise a memory and a file/disk storage subsystem.

The discussion here refers to the computing system having 'servers' or 'server computing devices.' In general, the server referred to here is a server computing device with a processor and a memory that operates on the user information and provides information back to the users relating to other users in the community of users that subscribe to the same service. Typically, there will be an application server computing device and a global positioning service server that will communicate with the user device or the server. No limitation of any function being performed by one of the devices is intended nor should it be implied.

The network may consist of any appropriate network, including an intranet, the Internet, a cellular network, a local area network, a satellite network, or any other such network and/or combination of these. Components used for such a system can depend at least in part upon the type of network and/or environment selected. Protocols and components for communicating via such a network are well known and will not be discussed here in detail. Wired or wireless connections, or combinations of these, may enable communication over the network. In the embodiments here, the network includes the Internet and/or cellular communications. The computing system 14 receives the requests and serves information in response to those requests via the network 18.

The computing system 14 in combination with data store 16, or by itself, may consist of multiple servicers, layers or other elements, processors, or components, which may be chained, clustered, or otherwise configured, performs the tasks such as interacting with the client computing device 12 and the data store 16. In some embodiments, some or all of the data store 16 may be housed in or integrated with the computing system 16. Servers, as used here, may be implemented in various ways, such as hardware devices or virtual computer systems. Server may refer to a programming module executed on a computing system. The term 'data store' refers to any device or combination of devices capable of storing, accessing, and retrieving data. This may include any combination and number of data servers, databases, data storages devices and media, in any standard, distributed, or clustered environment.

The computing system 14 may consist of a machine learning system, including an artificial intelligence system, which may in turn comprises a neural network of processing elements. Further, operations described herein as being performed by a single device may, unless otherwise clear from context, be performed collectively by multiple devices, which may form a distributed and/or virtual system.

The data store 16 can include several separate data tables, databases, data documents, dynamic data storage schemes and/or other data storage mechanisms and media for storing data relating to an aspect of the present disclosure. For example, the data store illustrated may include mechanisms for storing temporary data and general data storage. The data store also is shown to include a mechanism for storing alert data, which can be used to generate one or more alerts as described above. It should be understood that there could be many other aspects that may need to be stored in the data store, such as page image information and access rights information, which can be stored in any of the above listed mechanisms as appropriate or in additional mechanisms in the data store 16.

The environment can include a variety of data stores and other memory and storage media as discussed above. These can reside in a variety of locations, such as on a storage medium local to (and/or resident in) one or more of the computers or remote from any or all the computers across the network. In a set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer, or speaker). Such a system may also include one or more storage devices, such as disk drives, optical storage devices and solid-state storage devices such as random-access memory ("RAM") or read-only memory ("ROM"), as well as removable media devices, memory cards, flash cards, etc.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 10 in FIG. 1 should be taken as being illustrative in nature and not limiting to the scope of the disclosure.

The embodiments here implement a machine learning system or framework that addresses three issues: data imbalance, optimal model selection, and interpretation of the model's resulting prediction.

The discussion below involves the use of the training data and models within a survey development system in which a user develops on-line surveys for distribution to a group of users. The "user" in this system refers to the person developing the survey, whom the system will ultimately notify if a question appears to be a DBQ, not the people who participate in taking the survey. One should note that the discussion focuses on this environment and this particular issue in survey questions and responses, but with some alterations, the methods and models may apply to other user query inputs outside of online surveys. FIG. 1 shows one embodiment of a system in which the machine learning system identifies and displays DBQs to the user.

Figure 2:
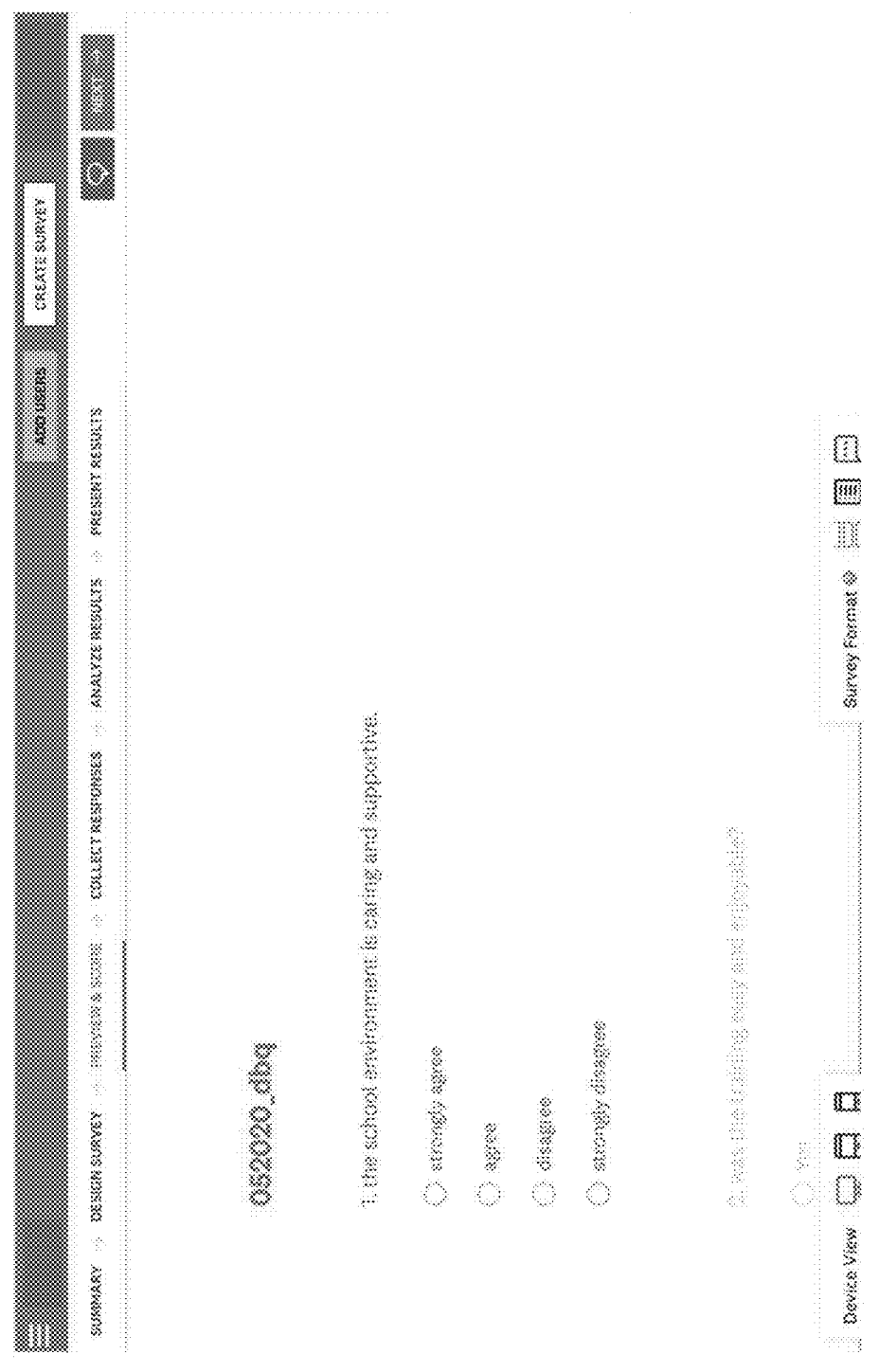

In FIG. 1, a user desires to build a survey for distribution to a group of users. The user, using a personal device such as 12, accesses an on-line survey provider system 14 across the network 18. As mentioned above, the personal device 12 may comprise one of many different types of devices having processors, memories and user interfaces, including but not limited to personal computers, laptops, tablets, and smart phones. The provider system 14 may comprise an enterprise system, either centrally located or distributed, including devices configured as computers, servers, and data repositories such as 16, etc. The user builds a survey that they will eventually distribute to a group of users. FIG. 2 shows an example of a question and its corresponding answer options.

While a person who understands DBQs may read the question in FIG. 2 and realize the issue, the user may not. The embodiments here allow the system itself to identify the DBQ without the user having to wait for a human to read all the questions and identify those as DBQs or not. While some embodiments of the machine learning may involve nominal human interaction, when in operation or production, the system will identify those questions on its own.

Figure 3:
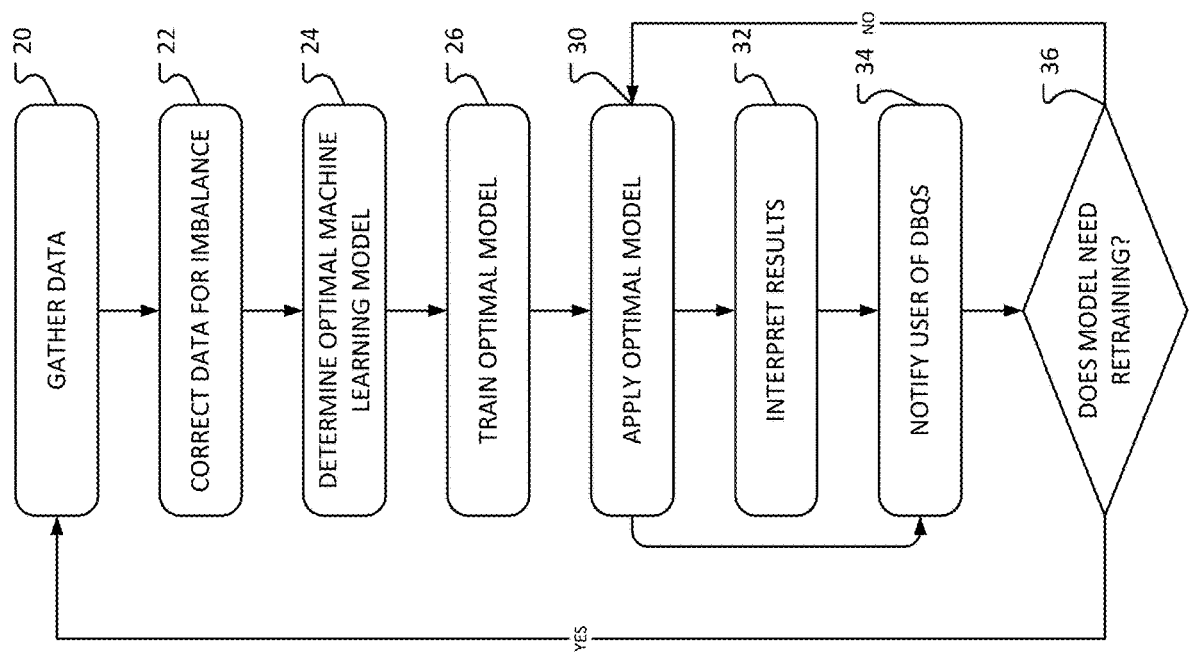
FIG. 3 shows a flowchart of a method to provide training data, train and operate a machine learning system.

FIG. 3 shows a flowchart of a method of providing training data sets, selecting an optimal model and then operating a machine learning system. The discussion here may refer to the combination of the machine learning system and the various aspects of its training and operation as a framework. The embodiments here provide unique solutions and approaches to various parts of the framework and the discussion will address them in more detail in further figures.

Initially, data is gathered at 20 to provide training data. One issue that arises in the machine learning environment occurs in the data used to train the machine learning system. The data contains data samples, defined above as input pairs of question text and its corresponding answer option text. The system randomly samples the data sets to collect samples that humans then label. However, the proportion of DBQs in the survey cohort is relatively small. Some preliminary analysis indicates that DBQs occur with about 5% probability. This implies that DBQs constitute about 5 samples in 100 samples.

Using a random sampling strategy to prepare the training data for a machine learning model, many fewer DBQs or positive classes, than non-negative DBQs or negative classes, exist. This results in an imbalanced data set. Imbalanced data sets used to train models can lead to biased prediction and decrease model performance.

Figure 4:
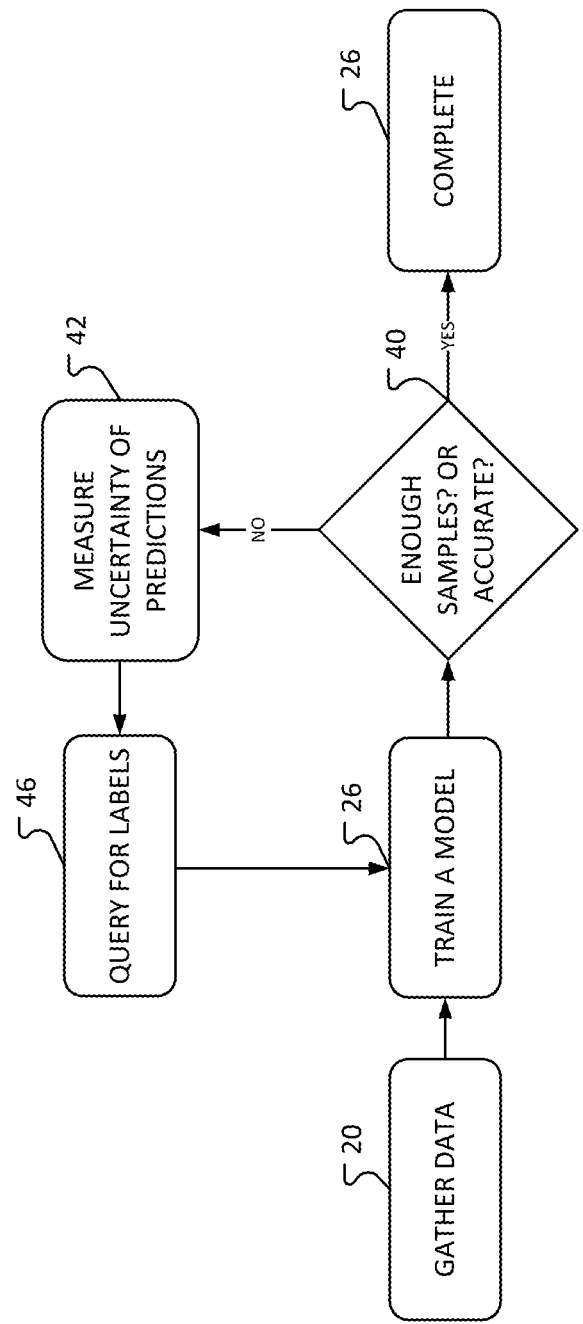
FIG. 4 shows an embodiment of a method to determine an optimal model for operation on user queries and answers.

One aspect of the embodiments allows the system to adjust for imbalanced data sets by employing a balancing strategy during training. The embodiments here employ active learning to collect enough true DBQs for machine learning. The idea of using active learning strategy is that fewer labeled training samples are required to label (by humans) to achieve a desired amount of DBQs than using random strategy. In a supervised learning embodiment, the system developers label the data sets with the inputs and corresponding outputs. However, many situations exist in which unlabeled data is abundant and manual labeling is expensive. Employing active learning to assist in the identification of samples for DBQ model training reduces this cost and provides more samples for better training of the model. FIG. 4 shows a flowchart of an embodiment of this process.

The system gathers the data at 20 and uses a small portion to train the model at 26. On a first iteration, the process may skip the testing process at 40, and move to the uncertainty measurement at 42. During the active learning process, the system calculates sampling scores for all unlabeled samples at 42 and the sample with the highest uncertainty is selected for labeling by humans at 46. These samples will more than likely comprise DBQs and are used in the training set of the model. Note that the human labeling is a function of correcting the data sets, not of the machine learning system in operation.

One example of calculating the sampling score is to employ uncertainty measure equation:

$$H(x) = -\sum_k p_k \log_2(p_k),$$

where $p_k$ is the sample probability belonging to the k-th class. For a 2-class classification:

$$H(x) = -(p_1 \log_2(p_1) + (1-p_1)\log_2(1-p_1))$$

In supervised machine learning, classifiers may comprise software that runs on one or more processing elements that maps input data into a category. Using an uncertainty measure provides a sound and fast approach to identify samples that require labeling, but the queried samples may have a bias towards a classifier's behavior. A method to overcome the bias uses a committee of a number "C" of classifiers and uses disagreement sampling with a vote entropy measure. Each classifier in the committee would apply the above uncertainty measure and then the resulting uncertainty measure used to determine if the sample requires labeling would be $$H(x) = -\sum_k q_k \log_2(q_k),$$

$$q_k = \frac{|\text{\# of models to choose } kth \text{ class}|}{C},$$

where the classifiers may use Random Forest, linear regression, gradient boosted regression trees, etc. One experiment found that active learning can increase the chance of sampling a true DBQ from 5% to 19.5%.

Figure 5:
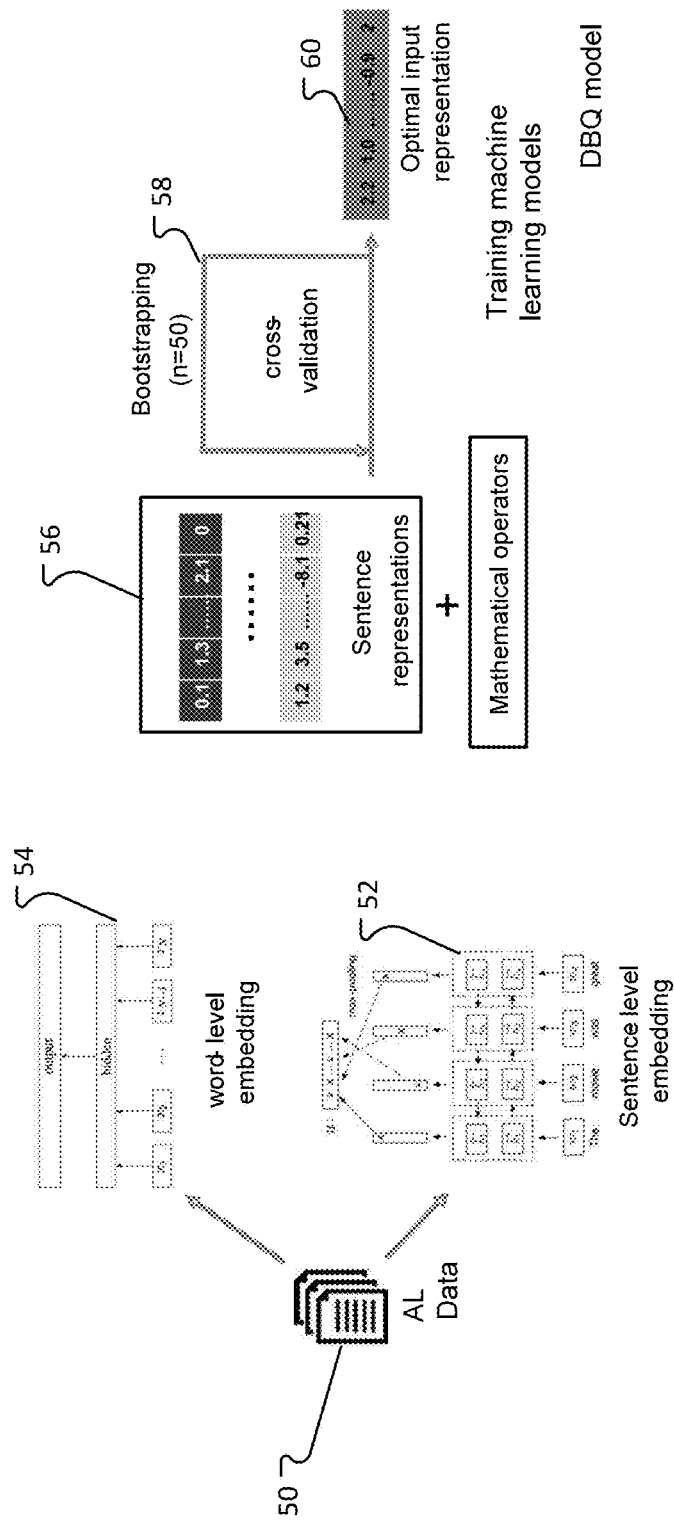
FIG. 5 shows an embodiment of a method to interpret a DBQ model predictor.

Returning to FIG. 3, the system now has corrected the data for the imbalance at 32 and begins to determine the optimal machine learning model for use. FIG. 5 shows an embodiment of this. The embodiments use a novel approach to learn the optimal vector representations for input samples to make the DBQ machine learning training more efficient, and therefore improve the model performance. This approach determines the optimal way of combing various word vector presentations to represent the input samples, which will be used as the inputs to the machine learning model. In FIG. 5, the process provides the active learning (AL) data 50 to one or both word level embedding and sentence level embedding to generate at least two word vector representations. First, vector representations are generated from a data sample, an input text pair. The vector representations may employ one or more recently developed embedding methods such as Word2vec, BERT (Bidirectional Encoder Representations), XLNet, Google USE, all by Google, SIF (Smooth Inverse Frequency), and Infersent and FastText by Facebook.

The resulting word vectors are then combined, possibly in different ways using mathematical operators, at 56 and the result is cross validated at 58, also referred to as boot strapping. The cross validation identifies the best combination method to combine these vector representations using mathematical operations, such as summation, etc. The combined input vector representation 60 is then used to represent the input text pair in training the machine learning model for DBQ classification. The resulting combination selected becomes part of the optimal model for the classification process.

Returning to FIG. 3, after determining the optimal model at 24, the model undergoes training at 26 using the training sets resulting from the balancing process. Once training completes and the cross validation process shows that the model functions accurately, the optimal model is applied at 30 to new data sets. The results from the model are interpreted at 32. The user will be notified if the prediction is that a particular question is a DBQ, and may be provided with further information that allows the user to see what word occurrences and combinations led to that prediction.

An issue that can arise with machine learning models may result in people not trusting the result. The "black-box" nature of the model produces a result but no reasoning as to how the model reached that prediction result. One aspect of the embodiments provides a way for the developers and users to see how important a particular token, discussed below, was in the final result. For example, if an input question asks, "Do you agree that Johnny is working hard and sleeps a lot?" the model will predict it as a DBQ. The interpretation model will give high scores to the tokens "working hard" and "sleeps a lot," but not to "Johnny is." The two actions are very different, which makes the question a DBQ and their contribution to that prediction is high.

Figure 6:
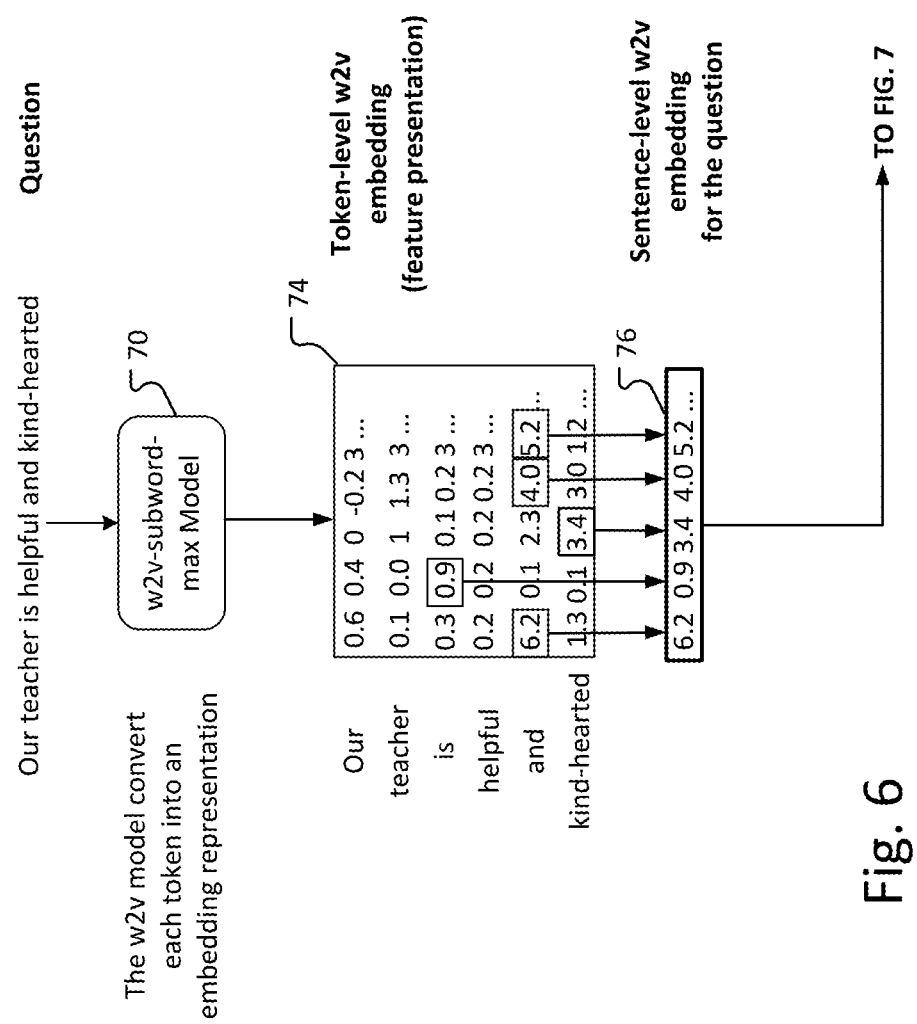
FIGS. 6-8 show embodiments of an interpretation in a DBQ model.
Figure 7:
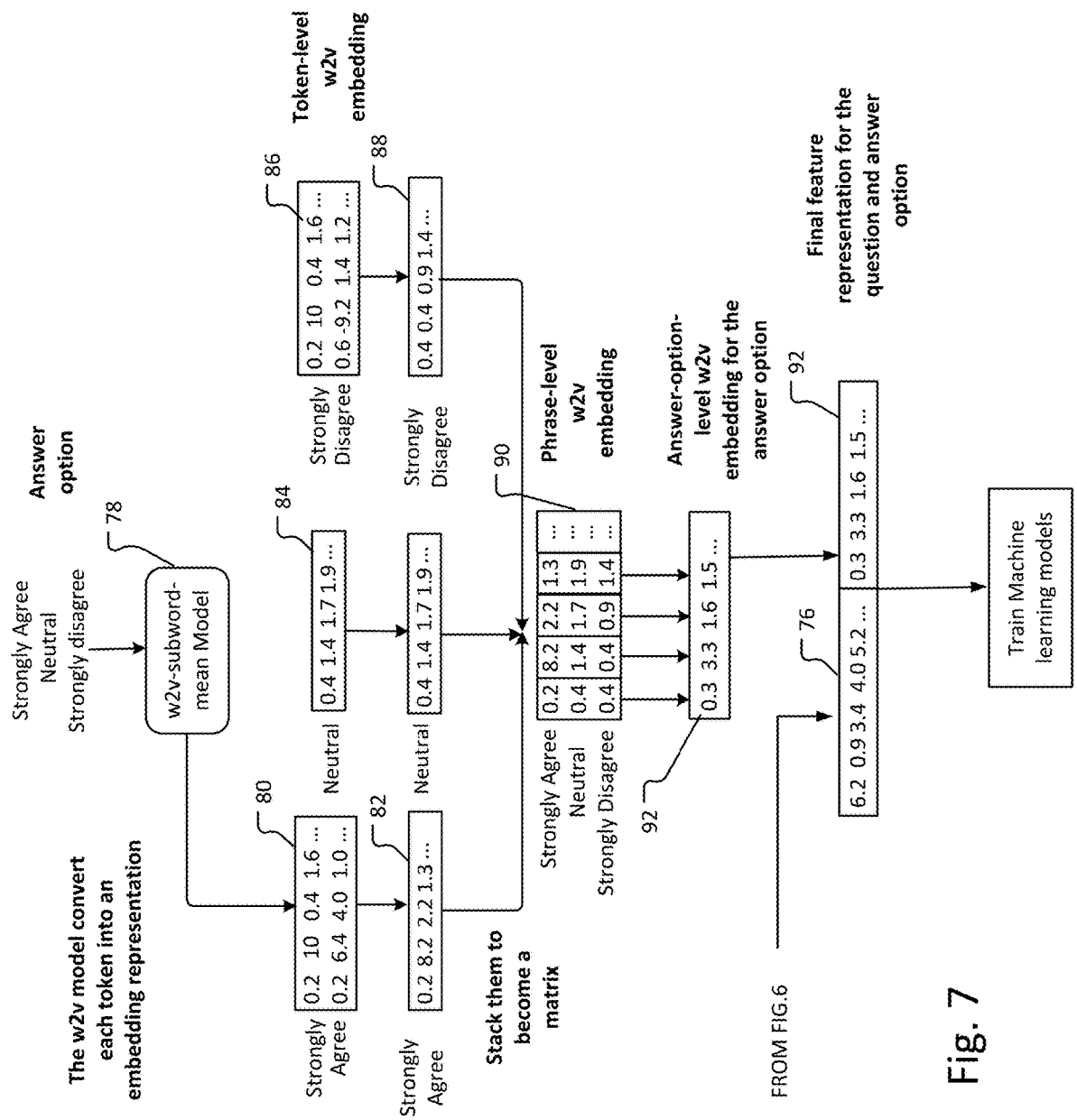
Figure 8:
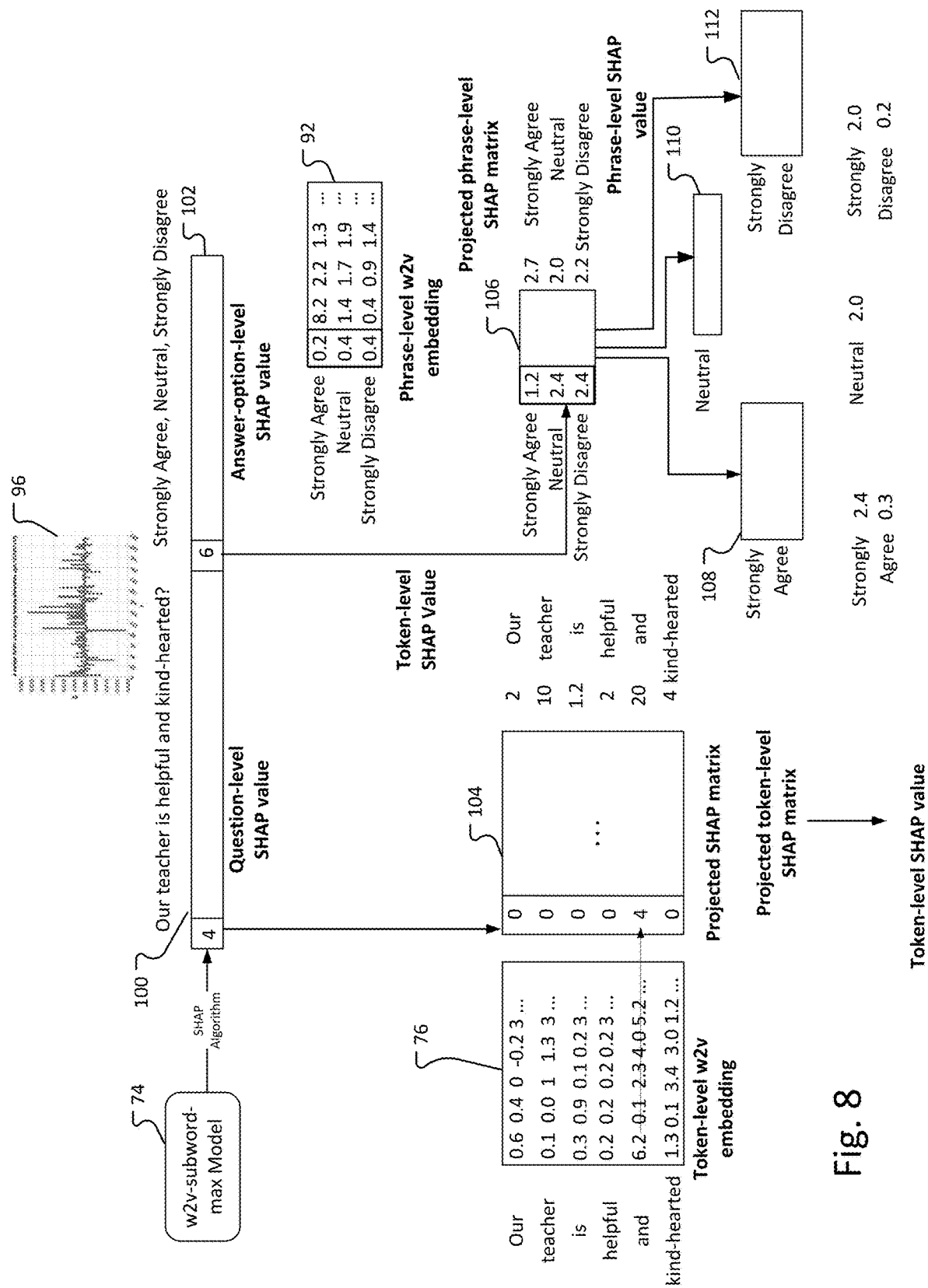

FIGS. 6-8 show an embodiment of the machine learning model that shows the importance of the tokens in predicting whether a question is a DBQ. This particular embodiment uses FastText, but any of the word embedding techniques could be used. The figures refer to these as "w2v" models, meaning word to vector. FastText, for discussion purposes, was the model selected at 24. One embodiment, discussed at FIG. 8, propagates the vector-level numerical SHAP values back to the word-level SHAP representation. A SHAP value provides a way to explain the output of any machine learning model. SHAP stands for Shapely Additive exPlanations. A "Shapely" value is typically defined as an average of marginal contributions across all permutations, or a measurement of the contribution of all of the predictors to the ultimate result. A SHAP value has some of the same aspects but essentially gives a breakdown of a prediction to show an impact of each feature. FIGS. 6 and 7 show the "forward" process of training the model for the question, FIG. 6, and the answer, FIG. 7, and then FIG. 8 shows an embodiment of the "backward" process applying the model.

In FIG. 6, the question and answer options undergo tokenization, which breaks down the sentences into tokens. Tokens usually consist of groups of characters, which in this case means words. In training, a model calculates the word vector representation at 70 for each word. As shown in FIG. 6, the phrase "Our teacher is helpful and kind-hearted?" has a vector representations for each word, such as "Our," "teacher," etc. Each word vector has a dimension of 1×N, shown at 74, where each column is a different dimension calculation for the word. For each index of the word vectors, the process combines the values from the first column in 74. These are then combined using a mathematical operator. In the embodiment of FIG. 6, the process applies a maximum operator so that the maximum value in the column, for example of the first column 6.2, will be selected. This is repeated to all the indices, or columns to obtain a combined representation of the question at 76. This is used to train the model when combined with the representation of the answer shown in FIG. 7.

FIG. 7 shows a similar process operating on the answer options of "strongly agree," "neutral," and "strongly disagree." Using a word to vector subword model based upon a mean of values at 78, the answers are first tokenized to their individual words, for the instances where there are more than one, at 80 and 86, then combined using a mean of the values for each dimension at 82 and 88. One should note that the selection of the operator remains with the designer. The examples here use "max" and "mean" as examples to demonstrate that any operator could be used for either side, independent of each other. However, the operator used in operation, such as that shown in FIG. 8, will depend upon the one used in training.

These values are then put into a matrix with the tokenization values for "neutral" at 90. The mean operator is then applied to each dimension, which are the columns, to obtain the results at 92. The representations 92 of the answer options is then combined with the representations of the question tokens of 76 and this is used to train the machine learning models.

Once the models are trained, the models can operate on incoming data sets, shown in FIG. 8 as one embodiment. In general, the SHAP values map back to the token-level based on the index retrieved. For the question side, which is of interest here, the index used derives from the max operator used during training. The SHAP values from 100 are entered into a matrix and combined with the original representation matrix 76 from FIG. 7. Only 1 row of the projected SHAP value matrix is shown at 104, but the values result from equation, Value=SHAP×1(max of w2v embedding). While only 1 column of the projected SHAP matrix is shown, the rows would then be populated by that equation using the SHAP values from 100. In this embodiment, the absolute value of either the mean or the max, or some other operator, will result in the values shown in the center. These are then used as the token-level SHAP values for the question, discussed in more detail in FIGS. 9 and 10.

On the answer side, similar processes occur, except to demonstrate that process may employ a different operation. Using the matrix 92 from FIG. 7, the projected phrase-level SHAP matrix results from combining that with the SHAP value using the formula:

$$\text{SHAP\_phrase}_{i,j} = \text{SHAP\_original}_i \times \frac{w2v\_embedding_{i,j}}{\sum_j w2v\_embedding_j}.$$

In the example of FIG. 8, an example using the top left value of the first column matrix 92 results in 6×((0.2)/(0.2+0.4+0.4))=6×(0.2/1.0)=1.2 as the first entry in the projected phrase level SHAP matrix 106. The values resulting from the matrix 106 for each answer option result from an operation performed on each row, producing the phrase-level SHAP values. These are then mapped back to each of the tokens in each phrase.

The output is a numerical value that represents the importance of every word token to the output DBQ prediction, that is, how importance of this word token to make the prediction to be positive (DBQ).

Figure 9:
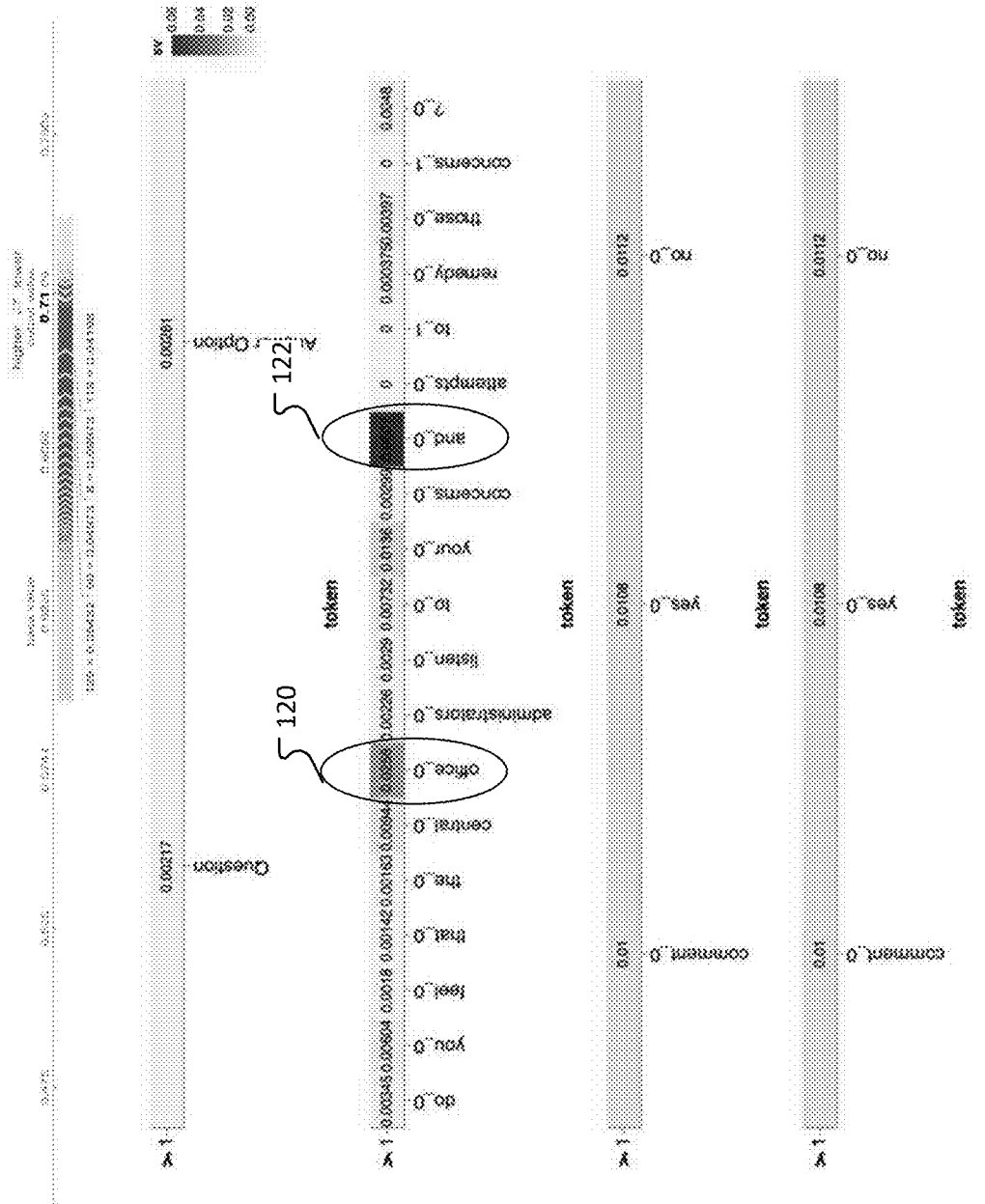
FIGS. 9-10 show embodiments of visualization results.
Figure 10:
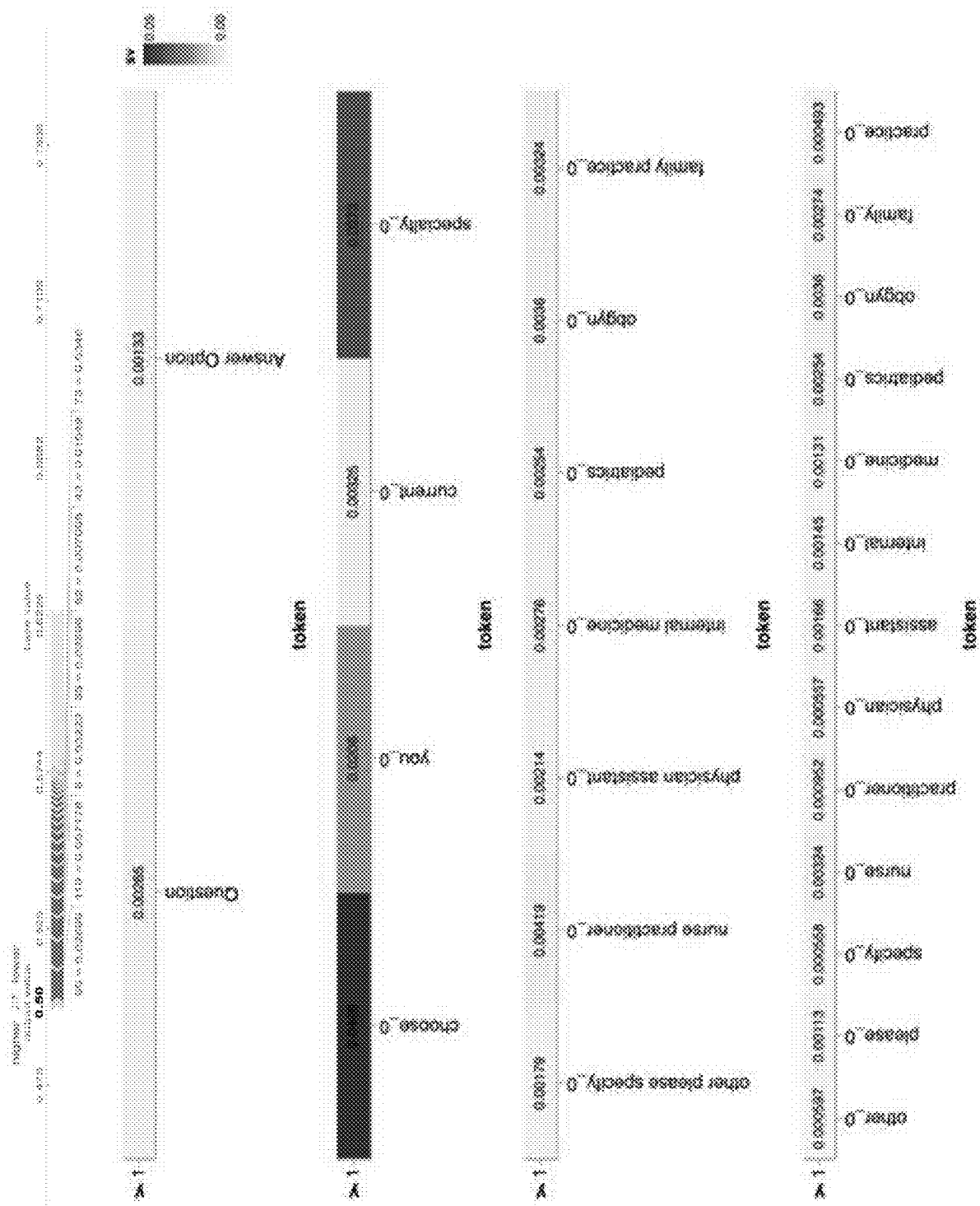

FIGS. 9 and 10 show examples of visualizations for a positive and negative prediction for a DBQ. In FIG. 9, the prediction was "positive" meaning that the model predicted that the question was a DBQ. This example had the question, "Do you feel that the central office administrators listen to your concerns and attempt to remedy those concerns?" with the answers being Yes or No. The key word "and" had a very high SHAP value at 0.0607 shown in circle 120, with the next highest SHAP value being the word "office" at 0.0256 shown in circle 122. The system may provide this information to the user to allow the user to see what words the user could change to eliminate the DBQ.

FIG. 10 shows a visualization of a negative DBQ prediction. The question was "Choose your current specialty." The answer options were "nurse practitioner," "physician's assistant," "internal medicine," "pediatrics," "obgyn," and "family practice." Most of the tokens in the bottom 3 lines of the diagram have relatively high max-SHAP values, and all specialties on the bottom line have similar max-SHAP values. This points to the question NOT being a DBQ.

FIG. 2, at 36 has a decision point as to whether the model needs retraining. This need for retraining could result from a schedule that sets out periodic retraining. It could also come from monitoring the performance of the model. For example, the performance of the model could drop below a particular threshold, indicating retraining. In addition, or alternatively, monitoring the visual results in FIGS. 9-10 could cause a developer to investigate. The visualization may act as an evaluation metric. If the visualization does not make sense, it indicates problems with the process, notifying the developers of a need to debug or otherwise improve the model.

Figure 11:
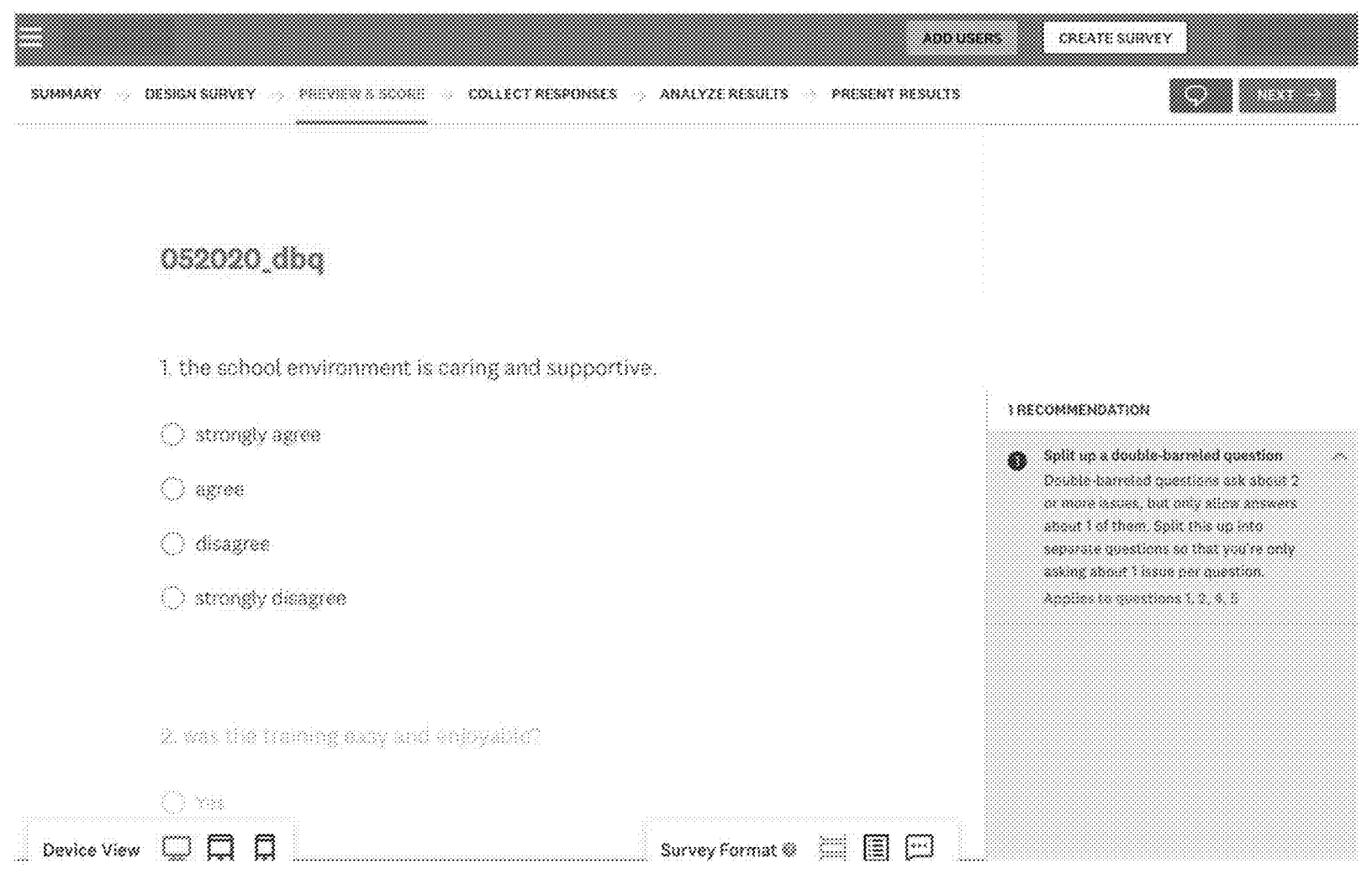

For the user, the above framework provides feedback on the user's questions by notifying them of the existence of DBQs. The user can then go fix the issues and the resulting survey will have reduced answer bias issues, providing the user with more accurate data. FIG. 11 shows one example of such feedback. As mentioned above, the visualization such as those shown in FIGS. 9 and 10 may also be provided.

In this manner, the embodiments provide a machine learning framework that has a method to balance the training data to improve the training sets and the resulting machine learning model. This will cause the machine learning model to work better and more accurately. The embodiments also provide a method to select automatically the best combination of vector analyses to provide an optimal machine learning model. This also causes the machine learning model to function better. The embodiments also provide insight into the functioning of the model to allow developers to monitor its performance and to provide users with more information on the basis of the predictions by providing a visualization to the users and developers through a display.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A computer-implemented method, comprising:
    gathering data samples into a data set;
    correcting for imbalance in the data set to produce a corrected data set by applying active learning to the data set to increase a number of double-barreled question data samples occurring in the data set;
    selecting an optimal machine learning model for the corrected data set;
    training the optimal machine learning model using the corrected data set;
    operating the optimal machine learning model on new data to produce a prediction result; and
    generating a visual representation of at least one prediction results.

2. The computer-implemented method as claimed in claim 1, wherein correcting for imbalance in the data set by applying active learning comprises:
    determining a sampling score for each sample;
    identifying a sample having a highest sampling score;
    acquiring a label for the sample having the highest uncertainty score;
    adding the sample to the training dataset; and
    repeating the determining, identifying, acquiring and adding to produce the corrected data set.

3. The computer-implemented method as claimed in claim 2, wherein determining the sampling score for each sample comprises determining an uncertainty measure for each sample, the uncertainty measure being a measure of whether a particular sample resides in a particular class.

4. The computer-implemented method as claimed in claim 3, wherein determining the uncertainty measure comprises determining the uncertainty measure using at least two classifiers, and combining the results from the at least two classifiers.

5. The computer-implemented method as claimed in claim 1, wherein selecting the optimal machine learning model comprises:
    generating at least two vector representations for an input text portion of each sample from at least two different methods;
    combining the at least two vector representations in different combinations;
    using cross validation to identify a best combination of the vector representations;
    using the best combination to represent the input text portion of the sample in the training dataset; and
    using the training dataset to train the machine learning model.

6. The computer-implemented method as claimed in claim 5, wherein generating at least two vector representations comprises generating at least one word-level vector representation and at least one sentence-level vector representation.

7. The computer-implemented method as claimed in claim 5, wherein combining the at least two vector representations comprises applying a mathematical operator to the at least two vector representations to produce the combinations.

8. The computer-implemented method as claimed in claim 1, wherein generating a visualization of the prediction result comprises displaying a value for each token in an input text portion of each data sample.

9. The computer-implemented method as claimed in claim 1, further comprising:
    receiving at least one data sample from a user as the new data;
    operating the optimal machine learning model on the new data to produce a prediction result, wherein the prediction result is whether the data sample from the user is a double-barreled question; and
    when the question is a double-barreled question, identifying the question as a double-barreled question to the user.

10. The computer-implemented method as claimed in claim 1, further comprising retraining the optimal machine learning model based upon one of either performance of the model or a periodic schedule.

11. The computer-implemented method as claimed in claim 10, wherein performance of the model is based upon the visualization of the prediction result.

12. A computer-implemented method to correct for imbalance in a data set using active learning, comprising:
    determining a sampling score for each sample in the data set using a committee of at least two classifiers to each provide a sampling score and then combining the sample scores by using an absolute value of a sum of a number of models to choose a particular class for each sample divided by the number of overall classifiers to produce the sampling score;
    identifying a sample having a highest sampling score;
    acquiring a label for the sample having the highest sampling score;

adding the sample to a training data set; and repeating the determining, identifying, acquiring, and adding to produce the training data set.

13. The computer-implemented method as claimed in claim 12, wherein determining the sampling score for each sample comprises determining an uncertainty measure for each sample, the uncertainty measure being a measure of whether a particular sample resides in a particular class.

14. A computer-implemented method to select an optimal machine learning model comprises:

generating at least two vector representations of a data sample comprised of an input pair comprising question text and a corresponding answer option text in a training set from at least two different methods of generating word vector representations;

combining the at least two vector representations in different combinations using different methods of combining;

using cross validation to identify a best method of combination of the vector representations;

using the best combination to represent the input pair of the sample in the training dataset; and using the training data set to train the machine learning model.

15. The computer-implemented method as claimed in claim 14, wherein generating at least two vector representations comprises generating at least one word-level vector representation and at least one sentence-level vector representation.

16. The computer-implemented method as claimed in claim 14, wherein combining the at least two vector representations comprises applying a mathematical operator to the at least two vector representations to produce the combinations.

* * * * *